US006498991B1

(12) United States Patent
Phelan et al.

(10) Patent No.: US 6,498,991 B1
(45) Date of Patent: Dec. 24, 2002

(54) PROCESS AND APPARATUS FOR MONITORING A PHYSICAL CONDITION OF A HOSE (75) Inventors: John Roux Phelan, Boulder, CO (US); Richard Stephen Pollack, Boulder, CO (US)

(73) Assignee: The Goodyear Tire & Rubber Company, Akron, OH (US)

(*) Notice: Subject to any disclaimer, the term of this patent is extended or adjusted under 35 U.S.C. 154(b) by 89 days.

(21) Appl. No.: 09/640,849

(22) Filed: Aug. 17, 2000

Related U.S. Application Data (63) Continuation-in-part of application No. PCT/US99/22882, filed on Oct. 1, 1999, and a continuation-in-part of application No. PCT/US99/23009, filed on Oct. 1, 1999.

(51) Int. Cl.[7] .............................................. G06F 19/00
(52) U.S. Cl. ......................... 702/34; 138/104; 138/125
(58) Field of Search ............................... 138/104, 125; 702/34

(56) References Cited

U.S. PATENT DOCUMENTS

| 4,446,892 A | * | 5/1984 | Maxwell | 138/104 |
| 5,228,478 A | * | 7/1993 | Kleisle | 138/104 |
| 5,498,079 A | * | 3/1996 | Price | 374/208 |
| 5,634,497 A |   | 6/1997 | Neto |  |
| 6,004,639 A | * | 12/1999 | Quigley et al. | 428/36.3 |
| 6,305,427 B1 | * | 10/2001 | Priest | 138/125 |
| 6,386,237 B1 | * | 5/2002 | Chevalier et al. | 116/208 |

FOREIGN PATENT DOCUMENTS

| DE | 37 05 617 | 9/1988 |
| DE | 44 02 136 | 7/1995 |
| EP | 0389406 | 9/1990 |
| EP | 0936089 | 8/1999 |
| GB | 2088607 | 6/1982 |
| WO | WO96/28311 | 9/1996 |

\* cited by examiner

Primary Examiner—John S. Hilten
Assistant Examiner—Stephen J. Cherry
(74) Attorney, Agent, or Firm—Howard M. Cohn (57) ABSTRACT An apparatus for monitoring the condition of a hose (100) including an inner liner (104) and a carcass (106) having at least one ply (108a, 108b, 108c, 108d or 108e) disposed in surrounding relationship with the inner liner (104) and an outer cover (300) about the carcass (106). The monitoring apparatus includes an electronic hose tag (310) connected to the hose (100) for measuring the vibration of the hose. In another embodiment, the hose includes at least one sensing element (112) helically wound about the inner liner (104) and an inner sensing element monitoring circuit (404) with a microprocessor (500) connected thereto for determining whether there is a discontinuity in the inner sensing element (112) and thus a worn through area of the inner liner (104). An alarm signal can be transmitted with transmitter structure (430) to a remote receiver (654).

10 Claims, 7 Drawing Sheets

PROCESS AND APPARATUS FOR MONITORING A PHYSICAL CONDITION OF A HOSE

CROSS REFERENCE TO RELATED APPLICATIONS

This Application is a Continuation-In-Part of PCT Patent Application Serial No. PCT/US99/22882 for APPARATUS FOR MONITORING A CONDITION OF A TIRE and PCT Patent Application Serial No. PCT/US99/23009 for a METHOD FOR MONITORING A CONDITION OF A TIRE, both filed Oct. 1, 1999 by the assignee of the present invention and having the same inventive entity as the present invention. Each of said PCT Applications, and the subject matter thereof, is hereby incorporated in their entirety by reference herein and made a part hereof.

TECHNICAL FIELD

This invention is generally concerned with a process and apparatus for monitoring a physical condition of a hose for moving abrasive materials, and more particularly with a process and apparatus for monitoring a wear condition of a portion of a hose for moving abrasive materials.

BACKGROUND OF THE INVENTION

Prior art structures for guiding moving masses of abrasive materials, such as mineral bearing ores in either a fluidized or dry bulk state, generally comprise a hose including an inner liner made of an abrasion resistant material, a carcass made of a plurality of pressure resistant layers disposed in surrounding relationship with the inner liner and an outer cover made of a wear resistant layer of an elastomeric material disposed in surrounding relationship with the carcass. Moreover, the hose, which has opposite free ends, may include a reinforcing steel wire helix deployed between a selected pair of carcass layers, and opposite couplings respectively connected to the opposite ends of the hose.

Sections of these hoses are typically deployed with a bend formed therein for connection to other straight sections of similarly constructed hoses or conduits. In the course usage, the abrasive materials flowing through the hoses gradually internally erode away the inner liner, especially at the bend, followed by successively eroding away the carcass layers. If left unchecked, the abrasive materials will finally erode away the elastomeric cover without there being any significant visible sign of such internal erosion until the hose either ruptures or explodes, with consequent spillage of the abrasive materials. Accordingly, a long standing problem that users have had with such hoses has been to provide accurate early warnings of internal erosion of the inner and carcass layers of the hose, to permit timely redeployment of the hose, i.e. to rotate the hose around about 90 degrees so that the abrasive material flowing into the bend will encounter a less worn section of the hose to enable greater usage of the hose prior to replacement thereof.

Various attempts have been made in the prior art to meet the aforesaid need. For example, U.S. Pat. No. 4,446,892, issued to Maxwell, discloses the provision in a wire sensing element between plies. When the innermost layer of the hose is worn through, the sensing element is concurrently worn through or otherwise broken, thereby creating an open circuit to a continuity test. This continuity test provides an early warning of significant internal wear and the need to replace the hose before rupture or explosion. Similarly, U.S. Pat. No. 5,634,497, issued to Neto discloses the provision of a plurality of layers of wires arranged to act as a single sensing element.

More recently, the assignee of the present invention has filed PCT Patent Application Serial No. PCT/US99/07899, filed Apr. 12, 1999 which discloses an abrasive material carrying hose that includes at least two resistance wire elements that respectively have free ends. Each of the resistance elements is helically wound about a different layer of hose material, including the inner liner and one of the carcass layers of the hose. In addition, a plurality of conventional, two-pole, electrical receptacles are provided. Preferably, the free ends of one of the resistance elements are electrically connected to one of the receptacles, and the free ends of the other resistance element are electrically connected to the other of the receptacles to permit separate continuity tests of the resistance elements via the respective receptacles. Further, a different continuity testing device is plugged into each of the receptacles. The continuity testing devices each include a battery for energization thereof, a resistance monitoring circuit and a multi-vibrator driven by the monitoring circuit. Each of the continuity testing devices also includes switching structure that is manually actuatable for energizing and de-energizing the continuity testing device, and includes a test switch connected to the resistance monitoring circuit. The test switch is operable for starting and stopping continuous testing of the associated for continuity. Moreover, the continuity testing devices each include a plurality of alarm structures, including audio and visual alarms and a receptacle that is adapted to be hard wired to a remote station. The alarm structures are respectively intermittently operable by the milti-vibrator whenever the resistance monitoring circuit detects a resistance discontinuity. In practice, when the respective alarm structures of one of the continuity testing devices provides an intermittent signal, indicating that the resistance element associated with the inner liner, and thus the inner liner itself, has worn through, the user intervenes by stopping the flow of abrasive materials to the hose, followed by axially rotating the hose about 90 degrees and re-starting the flow of abrasive materials to the hose. Thereafter, when the respective alarm structures of the other continuity testing device provides an intermittent signal indicating that the resistance element associated with a carcass layer, and thus the carcass layer itself, has worn through, the user again intervenes by stopping the flow of abrasive materials to the hose, followed by replacing the hose.

SUMMARY OF THE INVENTION

In the prior art, the early warning of hose failure is thus based upon detecting a discontinuity in a resistance wire after wear-through of the inner layer or carcass layer associated therewith. Earlier warning of imminent hose failure, such as partial erosion of a given resistance element or substantial but not complete erosion of a portion of the inner liner or a carcass layer of the hose, is very desirable because it would permit earlier implementation of corrective procedures with a view to prolonging the life of the given hose. In this connection it is noted that if users had access to historical data concerning their prior hose failures, a source of predictive information would be available to permit intermediate hose rotations with consequent prolongation of the life of the given hose.

Accordingly, an aspect of the present invention is to provide an improved process and apparatus for remotely monitoring a condition of a hose. A subsidiary aspect of the invention is to provide improved apparatus for monitoring vibration of a hose. And, another subsidiary aspect of the invention is to provide structure for collecting data relating to a plurality of prior hose failures.

According to the invention there is provided apparatus for monitoring a hose that includes an inner liner and a carcass disposed coaxially of, and in surrounding relationship with, the inner liner, wherein the carcass includes at least one ply. The hose also includes an outer cover that is disposed coaxially of, and in surrounding relationship with, the carcass. Preferably, the apparatus includes an electronic hose tag. Moreover the structure for connecting the tag to the hose preferably includes a vulcanized rubber patch having an arcuately-shaped radially outwardly extending side, and having an opposite side thereof that is configured for attachment to the hose cover.

In addition, according to the invention there is provided a process for monitoring a condition of a hose that includes an inner liner and a carcass disposed coaxially of, and in surrounding relationship with, the inner liner, wherein the carcass includes at least one ply. The hose also includes an outer cover that is disposed coaxially of, and in surrounding relationship with, the carcass. The process is characterized by the steps of connecting vibration sensing structure to the hose, providing an instrumentation amplifier, providing a microprocessor and connecting the vibration sensing structure thereto via the instrumentation amplifier. In addition, the process is characterized by the step of operating the instrumentation amplifier for providing an analog vibration sample signal to the microprocessor.

Moreover, according to the invention there is provided a process for monitoring a condition of a hose that includes an inner liner and a carcass having at least one ply disposed coaxially of, and in surrounding relationship with the inner liner. The hose includes an outer cover that is disposed coaxially of, and in surrounding relationship with the carcass and an inner sensing element helically wound about the inner liner. The process for monitoring is accomplished by providing an inner sensing element, a monitoring circuit, and a microprocessor connecting the inner sensing element to the monitoring circuit. The microprocessor is operated for providing an inner sensing element continuity sample signal to the microprocessor.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines, which would otherwise be visible in a true cross-sectional view, for illustrative clarity.

Elements of the figures are typically numbered as follows. The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in an other figure. In some cases, similar (including identical) elements may be referred to with similar numbers in a single drawing. For example, each of a plurality of elements 199 may be referred to individually as 199a, 199b, 199c, etc. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein.

DESCRIPTION OF THE PREFERRED EMBODIMENTS

A prior art hose 100 (FIG. 1) of the type that is used in an abrasive material transport system (not shown), is adapted for carrying a moving mass of an abrasive material (not shown), such as a mineral bearing ore in a fluidized or dry bulk state. The hose 100 comprises a tubularly shaped inner liner 104, which is made of an abrasion resistant material. In addition, the hose 100 comprises a carcass 106 including a plurality of tubularly shaped plies, 108a, 108b, 108c, 108d and 108e, that are respectively coaxially disposed in surrounding relationship with the inner liner 104. The plies 108a, 108b, 108c, 108d and 108e are made of a pressure resistant material for reinforcing the inner liner 104.

The hose 100 (FIG. 1) additionally includes an inner hose sensing element 112 including an inner pair of parallel-spaced resistance wires, 114a and 114b, that are helically wound about the inner liner 104 throughout the longitudinal length thereof. The wire 114a includes a lead 116a and a free end 118a, and the wire 114b includes a lead 116b and a free end 118b. And, the respective leads, 116a and 116b, are suitably electrically spliced to one another, as by twisting the leads, 116a and 116b, together. As thus constructed and arranged the inner hose sensing element 112 has a predetermined overall resistance value of typically 100,000 ohms, as measured between the opposite free ends 118a and 118b thereof. The hose 100 also includes at least one outer hose sensing element 120 including a pair of parallel-spaced resistance wires, 122a and 122b, that are helically wound about the longitudinal length of one of the carcass plies, 118a, 118b, 118c, 118d or 118e, exemplified by the carcass ply 118a. The wire 122a includes a lead 124a and a free end 126a, and the wire 122b includes a lead 124b and a free end 126b. And, the respective leads, 126a and 126b, are suitably electrically spliced to one another, as by twisting the leads, 126a and 126b, together. As thus constructed and arranged the outer hose sensing element 120 having opposite free ends, 126a and 126b, and having a predetermined overall resistance value of typically 100,000 ohms. Without departing from the spirit and scope of the invention one or more additional outer sensing elements that are substantially the same as the outer sensing element 120 may be wrapped about one or more of the remaining carcass plies, 118b–118e.

Figures 1, 2:
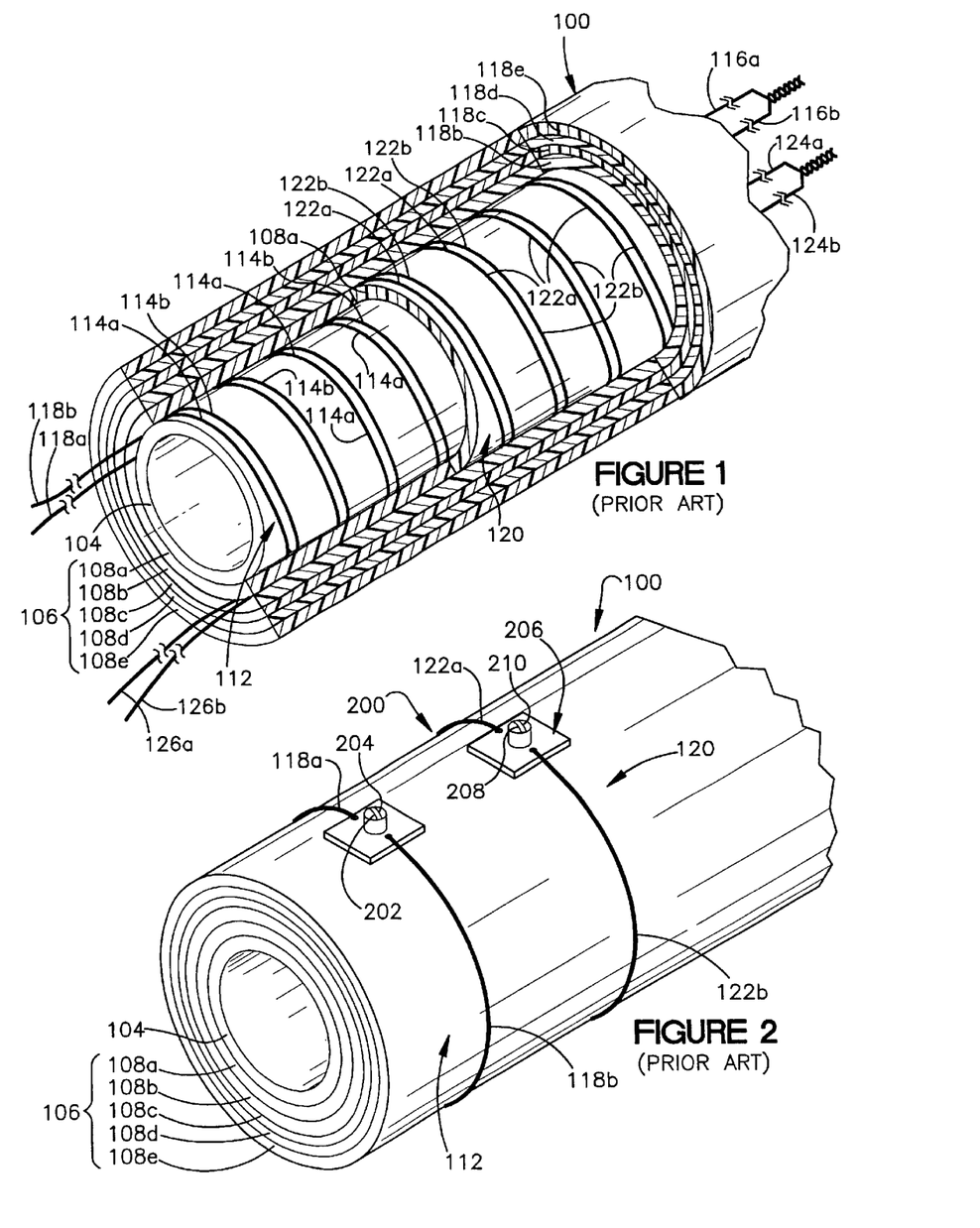
FIG. 1 is a perspective view of a partially cut away portion of a prior art hose incorporating resistance wire sensing elements.
FIG. 2 is a view of hose of FIG. 1 showing a later stage of construction thereof incorporating the respective female receptacles for the sensing elements.

The hose 100, as shown in FIG. 2, further includes a plurality of conventional two pole, female, electrical receptacles, including a inner sensing element test receptacle 200, having poles, 202 and 204. and a outer sensing element test receptacle 206, having poles 208 and 210. The test receptacles 200 and 206 are conventionally secured to the outer surface of outermost carcass layer 108e, as by applying an adhesive material therebetween. Moreover, the free ends 116a and 116b of the inner hose sensing element 112 are conventionally electrically connected, on a one-for-one basis, to the respective receptacle poles 202 and 204, and the free ends 126a and 126b of the outer hose sensing element 120 are conventionally electrically connected, on a one-for-one basis, to the respective receptacle poles, 208 and 210.

Figure 3:
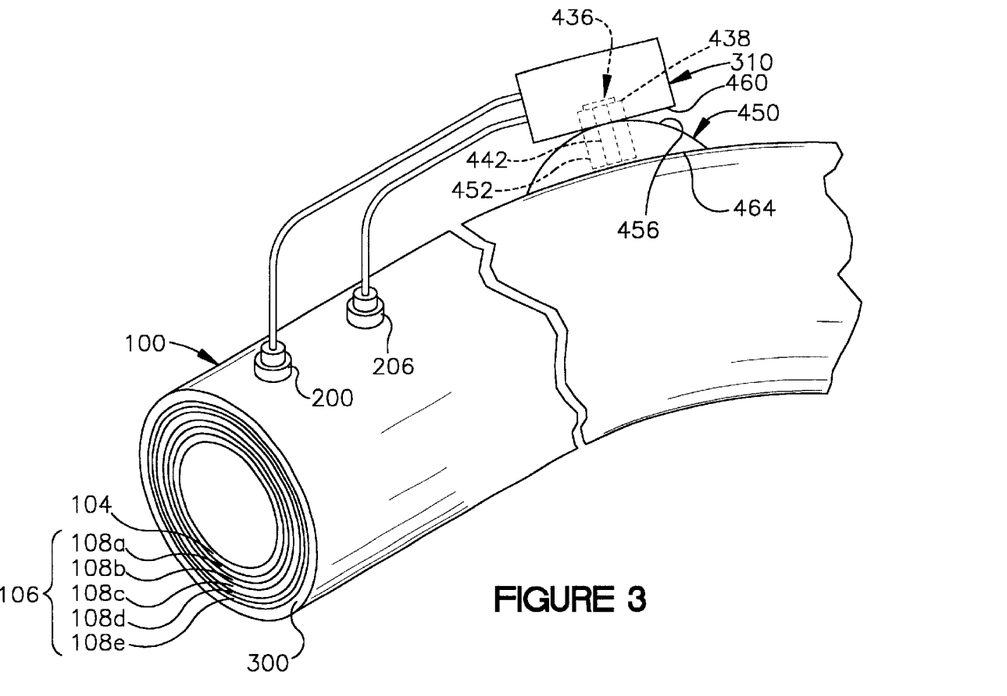
FIG. 3 is a view of the hose of FIG. 2 showing a still later stage of construction thereof, incorporating the elastomeric cover, and showing an electronic hose tag according to the present invention connected to the hose.

The hose 100, as shown in FIG. 3 additionally includes a cover 300 that is made of a wear resistant layer of elastomeric material that is coaxially disposed in surrounding relationship with the carcass 106 for protection thereof. Moreover, the hose 100, which has opposite free ends (not shown) may include a reinforcing steel wire helix (not shown) that is embedded between a selected pair of the carcass layers, 108a–108e. Further the hose 100 may include opposite end couplings (not shown) that are respectively connected to the opposite ends (not shown) of the hose 100.

Figure 4:
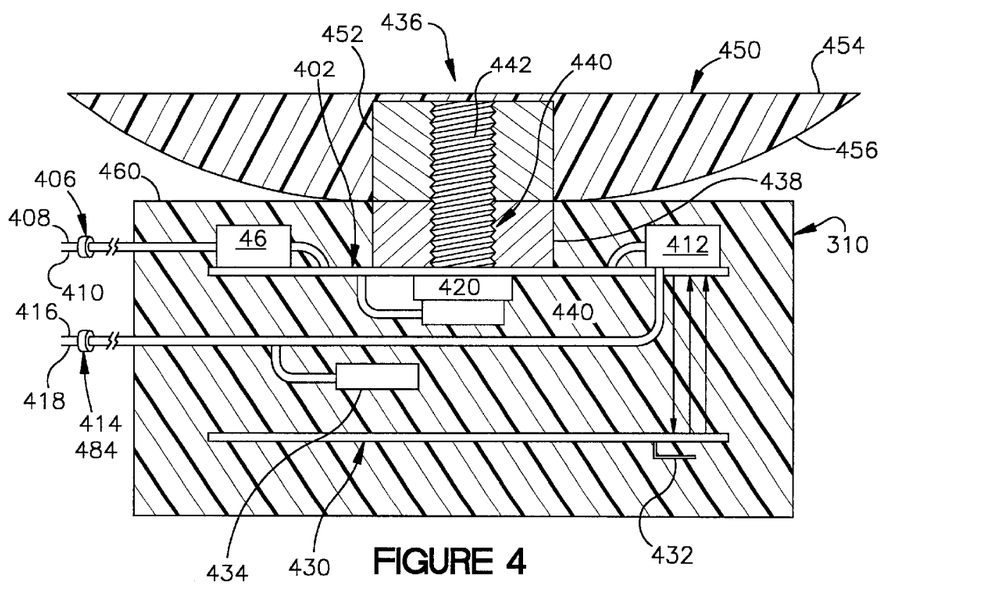
FIG. 4 is an enlarged transverse cross-sectional view of the electronic hose tag of FIG. 3.

According to the invention, there is also provided an electronic hose tag 310, as shown in FIG. 3 that is physically mounted on the hose cover 300 and is separately electrically connected to the respective inner and outer sensing-element test receptacles, 200 and 206. The electronic hose tag 310, as shown in FIG. 4, is a modified version of the electronic tire tag disclosed in the aforesaid cross-referenced PCT Patent Application Nos. PCT/US99/22882 and PCT/US99/23009. The electronic hose tag 310 generally comprises a micro-controller 402. In addition, the electronic hose tag 310 includes an inner sensing element monitoring circuit 404 that is conventionally electrically connected to a two pole, male, inner sensing element plug 406. The inner sensing element plug 406 includes poles, 408 and 410, that are dimensioned for removable insertion into the inner sensing element test receptacle 200 (FIG. 3). Moreover, the electronic hose tag 310 (FIG. 4) includes an outer sensing element monitoring circuit 412 that is conventionally electrically connected to a two pole, male, outer sensing element plug 414. The outer sensing element plug 414 includes poles, 416 and 418, that are dimensioned for removable insertion into the outer sensing element test receptacle 206 (FIG. 3). The respective inner and outer sensing element monitoring circuits, 404 and 412, are also respectively conventionally electrically connected to the micro-controller 402 to permit control thereby for sampling the electrical resistance of the respective inner and outer hose sensing elements, 112 and 120 (FIG. 1).

In an abrasive material transport system (not shown) that incorporates a hose 100 (FIG. 3) according to the invention, fluctuations in pressure and velocity normally develop in the flow of abrasive materials, due to pump fluctuations, and due to flow instabilities and turbulence generation in the abrasive materials. As such fluctuations are propagated within the transport system, they cause vibration of the components of the system, leading to excessive deflection, fatigue damage, erosion of contact surfaces and undesirable noise levels developing in the system components. Thus the hose 100 of the present invention, has a threshold amplitude of vibration when the transport system in which it is mounted starts pumping materials therethrough, and, the amplitude of vibration increases over time due to the erosion of contact surfaces of the hose 100. Accordingly, the electronic hose tag 310 (FIG. 4) preferably includes vibration amplitude sensing structure 420 that is electrically connected to the micro-controller 402 to permit control thereby for sampling the amplitude of vibration of the hose 100 (FIG. 3).

Moreover, the electronic hose tag 310 (FIG. 4) includes transmitter structure 430 having an antenna 432. The transmitter structure 430 is electrically connected to the micro-controller 402 and operable under the control thereof for transmitting relevant information concerning the respective samplings taken by the inner and outer sensing element monitoring circuits, 404 and 412, and the vibration sensing structure 420. Still further, the electronic hose tag 310 includes a battery 434 that is shown fixedly electrically connected to the micro-controller 402 for energization thereof, but is preferably conventionally removably electrically connectable to the micro-controller 402. The electronic hose tag 310 also includes structure 436 for connecting the tag 310 to the hose 100 (FIG. 3). The connecting structure 436 (FIG. 4) preferably includes a first internally threaded nut 438, and an externally threaded bolt 440. The bolt 440 is permanently threadably connected to the first nut 438 and has a threaded portion 442 thereof extending from the tag 310. Preferably the tag 310 is entirely encapsulated in a plastic material 444 that typically includes a mixture of epoxy and glass beads coated with urethane.

Preferably, the encapsulated electronic hose tag 310 (FIG. 4) is not directly connected to the cover 300 (FIG. 3) of the hose 100. Rather, according to the invention, the connecting structure is a vulcanized rubber patch 450 (FIG. 4). The patch 450 preferably includes, embedded therein, a second, internally threaded, nut 452. Moreover, the patch 450 preferably has a side 454 thereof that is conventionally configured for suitable connection, as by means of an adhesive material, to the hose cover 300 (FIG. 3), and has an arcuately-shaped, centrally radially outwardly extending side 456 thereof. The arcuate side 456 of the patch 450 protrudes radially outwardly of the hose 100. On the other hand, the encapsulated hose tag 310 has a substantially rectangularly shaped transverse cross-section and includes a substantially straight side edge 460.

The encapsulated tag 310 (FIG. 4) is connected to the patch 450 by threadably connecting the bolt portion 442 to the second nut 452. Since the second nut 452 is disposed substantially in abutment with the hose cover 300 (FIG. 3), when the patch 310 is connected thereto, the bolt portion 442 is also disposed substantially in abutment with the hose cover 310 when the bolt portion 442 is connected to the second nut 452. Further, due to the arcuate shape of the outer patch side 456, when the hose tag 310 is attached to the patch 450, the tag side edge 460 is separated from the patch 450 along substantially two-thirds of the arcuately-extending side 456 of the patch 450, and connected substantially in abutment with the second nut 452 along the centrally radially protruding area thereof where the bolt portion 442 of the tag 310 is threadably connected to the second nut 452. Thus, hose vibration is substantially completely transmitted to the tag 310 via the bolt portion 442 and second nut 452, rather than via the elastomeric portion of the patch 310. Accordingly, the vibration sensing structure 420 is preferably physically connected directly to the bolt 440 for sensing the amplitude of vibration thereof, and thus of the hose cover 310 due to the bolt portion 442 being disposed substantially in abutment therewith.

Figure 5:
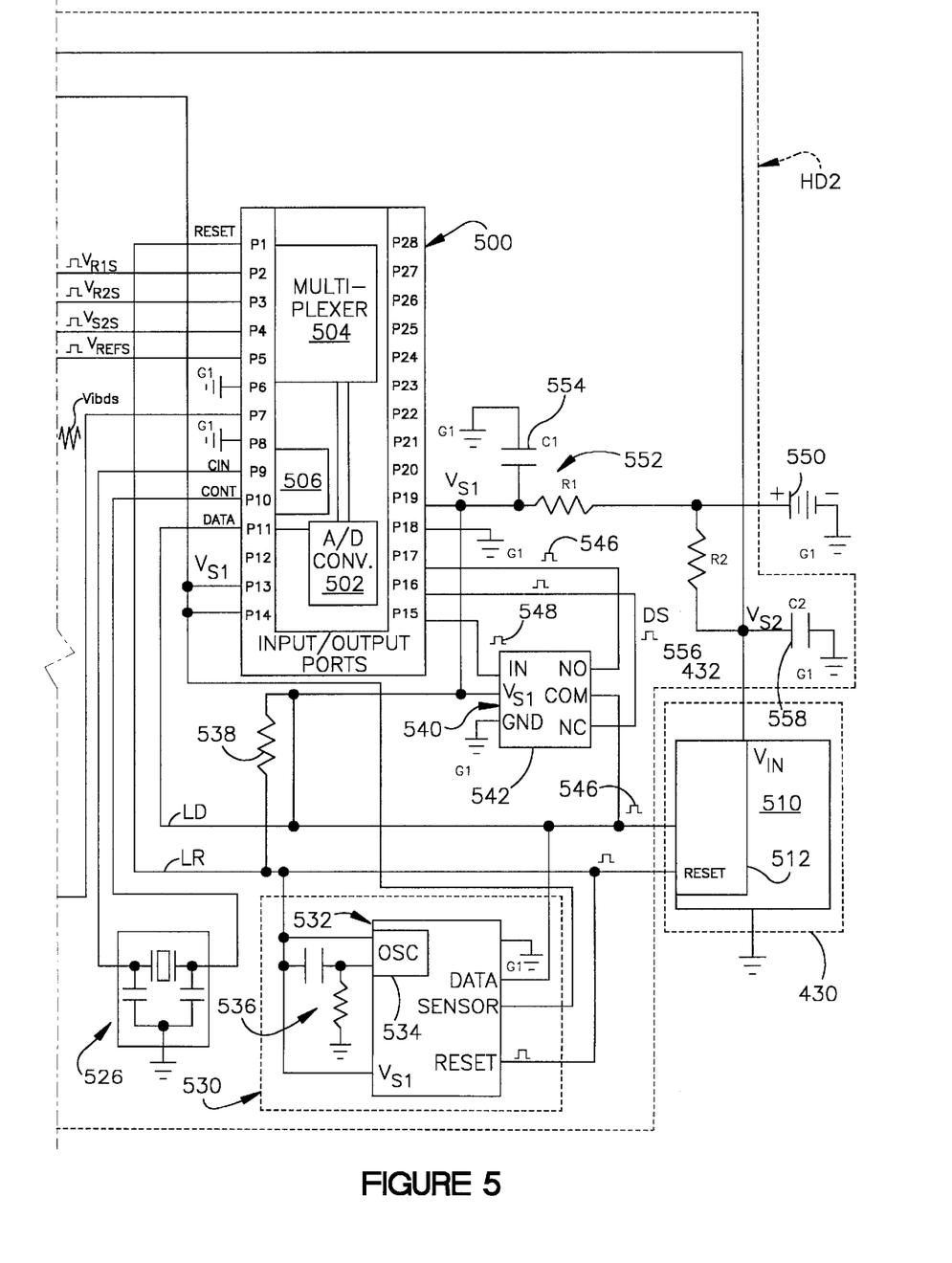
FIG. 5 is a portion of a detailed diagram of the electronic hose tag circuits and structures of FIG. 4.

As shown in greater detail in FIG. 5, the micro-controller 402 includes a first conventional microprocessor 500, having ports p1 through p28 inclusive. The first microprocessor 500 internally includes a conventional analog to digital (A/D) converter 502. In addition, the first microprocessor 500 internally includes a conventional multiplexer 504 that is conventionally electrically connected to a plurality of the ports, p2–p5 and p7, of the first microprocessor 500. Moreover, the first microprocessor 500 internally includes a conventional clock circuit 83 connected to ports p9 and p10 thereof.

Figure 5A:
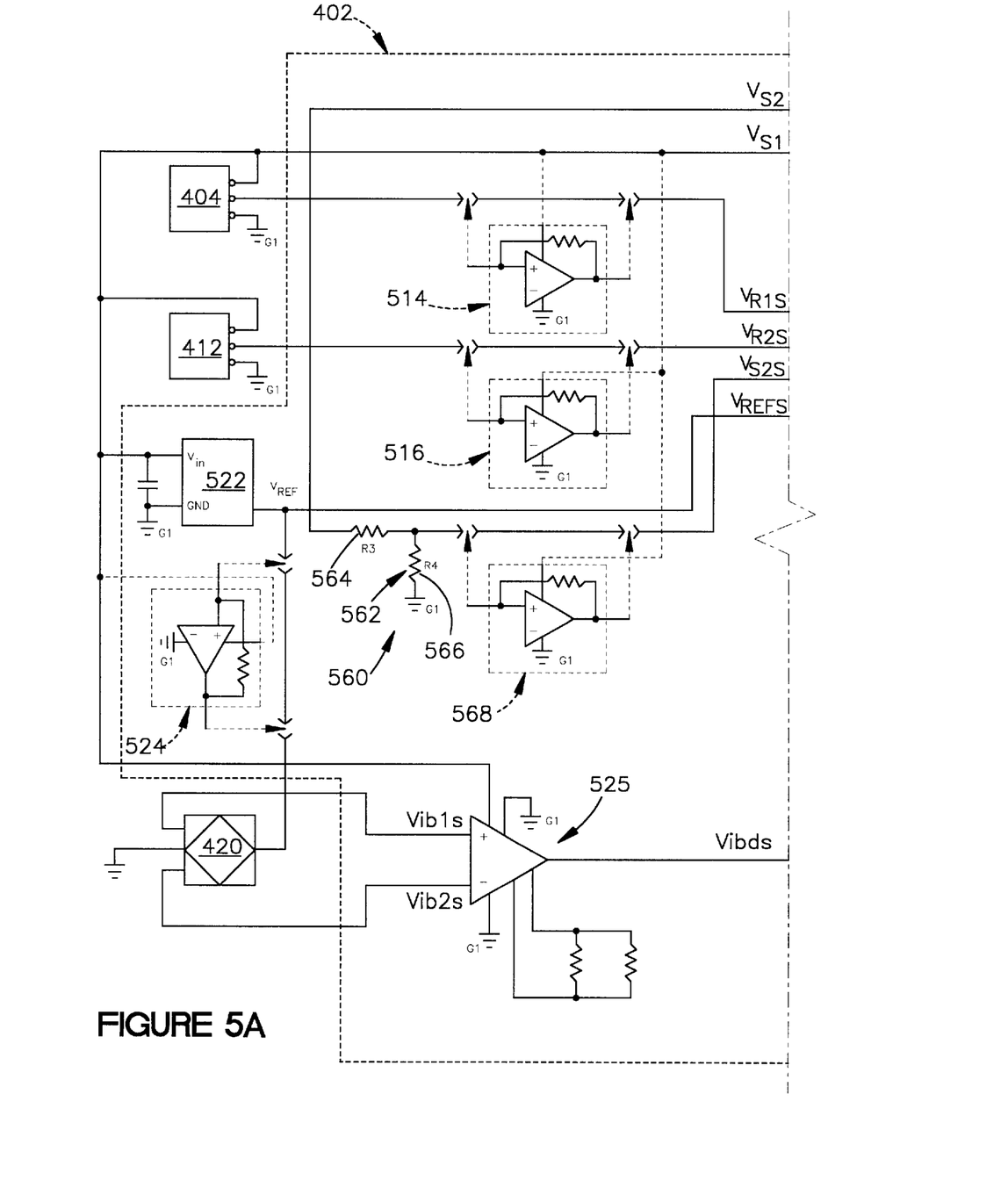
FIG. 5A is another portion of the detailed diagram the electronic hose tag circuits and structures of FIG. 4.

Further, the transmitter structure 430 (FIG. 5) includes a second conventional microprocessor 510 having an internal counting circuit 512, that is conventionally electrically connected to respective reset and data terminals, ports p1 and p11, by means of reset and data leads "Lr" and "Ld" of the first microprocessor 500, for receiving therefrom respective reset and data signals "Rs" "Ds". Preferably, the inner and outer sensing element monitoring circuits, 404 and 412 (FIGS. 4 and 5A), are directly electrically connected to the first microprocessor 500 (FIG. 5), at ports p2 and p3 thereof, for providing respective first and second continuity sampling signals, such as the signals "Vr1s" and "Vr2s" thereto. Optionally, the micro-controller 402 (FIGS. 5 and 5A) may include first and second operational amplifiers, 514 and 516, respectively connected between inner and outer sensing element monitoring structures, 404 and 412, and the first microprocessor 500 for providing amplified continuity sampling signals, Vr1s and Vr2s, thereto. Furthermore, the micro-controller 402 includes conventional reference voltage generating structure 522 that is preferably directly connected to the vibration sensing structure 420, for providing a reference voltage signal "Vref", thereto. The reference voltage generating structure 420 is additionally conventionally connected to the first microprocessor 500, at port p5 thereof, for also providing the reference voltage sample signal Vrefs thereto. Optionally, the micro-controller 402 may include of a third operational amplifier 524 that is conventionally electrically connected between the reference voltage generating structure 522 and the vibration sensing structure 420 for providing an amplified reference voltage signal Vref thereto.

In addition, the micro-controller 402 (FIGS. 5 and 5A) preferably includes an instrumentation amplifier 525 that is conventionally electrically connected between the vibration sensing structure 420 and the first microprocessor 500, at port 7. The vibration sensing structure 420 (FIG. 4) samples the vibration of the hose cover 300, and thus the hose 100, under the control of the first microprocessor 500 (FIGS. 5 and 5A) and provides a first, analog, vibration amplitude sensing signal "Vib1s" to the instrumentation amplifier 520. The signal Vib1s corresponds to an initial threshold value of vibration amplitude of the hose 100 at the time "t1' when use of the hose 100 is initiated. The vibration sensing structure 420 also provides sequential second, analog, vibration amplitude sensing signals "Vib2s" to the instrumentation amplifier 525 that respectively correspond to the initial and each subsequent value of vibration amplitude of the hose 100 from the time t1 when use of the hose 100 is initiated. And, the instrumentation amplifier 525 generates and provides to the first microprocessor 500 an analog vibration amplitude difference signal "Vibds" that corresponds to the difference between the first and second vibration amplitude signals Vib1s and Vib2s. As thus constructed and arranged the analog vibration amplitude difference sample signal Vibds has a zero value when use of the hose 100 is initiated, is at a first maximum value when the inner sensing element monitoring circuit 404 provides a discontinuity signal indicating that the inner layer 104 of the hose 100 has worn through and is at a second maximum level when the outer sensing element monitoring circuit 412 provides a discontinuity signal indicating that the outer layer 118a of the hose 100 has worn through.

The micro-controller 402 (FIG. 5A) additionally includes a conventional oscillator 526 having clock input and clock output leads, "Cin" and "Cout, respectively electrically connected to the first microprocessor 500, at ports p9 and p10, and thus to the clock circuit 506 thereof.

Moreover, the micro-controller 402 (FIG. 5) preferably includes suitable watchdog timing structure 530 that is conventionally electrically connected across the data and reset leads, Ld and Lr, of the transmitting structure 50 and to port p13 of the first microprocessor 500. The watchdog timing structure 530 includes a third conventional microprocessor 532 having a conventional, internal, low frequency counting oscillator 534. Moreover, the watchdog timing structure 530 includes higher frequency reset-signal generating oscillator 536 externally of the third microprocessor 532. The internal counting oscillator 534 continuously sequentially counts seconds for a predetermined time interval, provides a count signal Cs to the reset-signal generating oscillator 536 upon counting for the predetermined time interval, and then recycles to commence a new count. If the watchdog timing structure 530 does not sense either a voltage level Vs1 at port p13 of the first microprocessor 500, or a transmitter data signal Ds, then, upon receiving the count signal Cs, the reset signal generating oscillator 536 provides a wake-up resetting signal "Wup" to both the transmitter structure 430 and the first microprocessor 510, on the reset lead Lr, and the first microprocessor 500 via a conventional high impedance pull-up resistor 538 connected to port p1 of the first microprocessor 500.

The micro-controller 402 (FIG. 5) also includes a single pole, double throw, electronic switch 540. The switch 540 is conventionally electrically connected to the first microprocessor 500, at port p20 thereof, for energization therefrom. The switch 540 preferably includes an input signal terminal "in" electrically connected to the first microprocessor 500, at port p15 thereof, for receiving input signals, such as the signal 544 therefrom. In addition, the switch 540 has a common "com" terminal electrically connected to the data terminal of the transmitting structure 430 and port p11 of the first microprocessor 500. Furthermore, the switch 540 includes normally closed and normally open terminals, "nc" and ""no", that are respectively electrically connected to the first microprocessor 500 at ports p17 and p18 thereof.

The switch 540 is usually in the normally open "no" position thereof, for providing, from port p18 of the first microprocessor 500, continuity, vibration amplitude. reference voltage level and transmitter voltage level digital data signals Ds to the transmitter structure 430 via the data lead Ld. After having provided such data signals Ds, the first microprocessor 500 applies a signal, such as the signal 548, from port p15 thereof to the switch 540, resulting in the switch 540 being switched to the normally closed position "nc". Whereupon the transmitter structure 430 provides an acknowledgement signal "Ack" on the data lead Ld to port p17 of the first microprocessor 500 followed by returning the data, signal Ds, thereto. In the event that the data signal Ds is applied without an acknowledgement signal Ack, then, the first microprocessor 500 causes the switch 540 to be returned to the normally open position "no" thereof and repeat the provision of the data signal Ds, and so on, until either an acknowledgement signal Ack is provided to the first microprocessor 500 or the data signal Ds has been applied to the data lead Ld a total of three times.

The battery 550 (FIGS. 5 and 5A) s conventionally electrically connected to the first microprocessor 500 by means of a first RC circuit 552, having a first conventional storage capacitor 554 for providing a first stabilized input voltage "Vs1" to the first microprocessor 500 at port p20, the switch 540 and the watchdog timing structure 530, for respective energization thereof. Moreover, the battery 550 is conventionally electrically connected to the transmitting structure 430 by means of a second RC circuit 556, having a second conventional storage capacitor 558 for providing a second stabilized input voltage "Vs2" to the transmitter structure 430 for energization thereof. The micro-controller 402 also preferably includes transmitter voltage sensing structure 560 that is conventionally electrically connected between the second storage capacitor 558 and the first microprocessor 500, at port p4, for sensing the transmitter-structure input voltage Vs2 and providing an input voltage sample signal "Vs2s" to first microprocessor 500. The transmitter input voltage sensing structure 560 preferably includes a high impedance voltage dividing circuit 562 having a first high impedance resistor 564 connected in series with the first microprocessor 500 and a second high impedance resistor 566 connected across the first microprocessor 500 to ground "G1". Optionally, the transmitter input voltage sensing structure 560 may include a fourth operational amplifier 568 that is conventionally electrically connected between the first resistor 564, of the voltage dividing circuit 562, and the first microprocessor 500, for providing an amplified transmitter voltage input sample signal Vs2s to port p4 of the first microprocessor 500. The first microprocessor 500 additionally includes a voltage output lead "Vs1" extending to the inner and outer sensing element monitoring circuits, 404 and 412, the reference voltage generating structure 522 and the instrumentation amplifier 525, respectively, for energization thereof. Moreover, assuming the provision of one or more of the first, second third or fourth operational amplifiers, 514, 516, 524 and 568, the voltage output lead Vs1 would also extend thereto for energization thereof.

Figure 6:
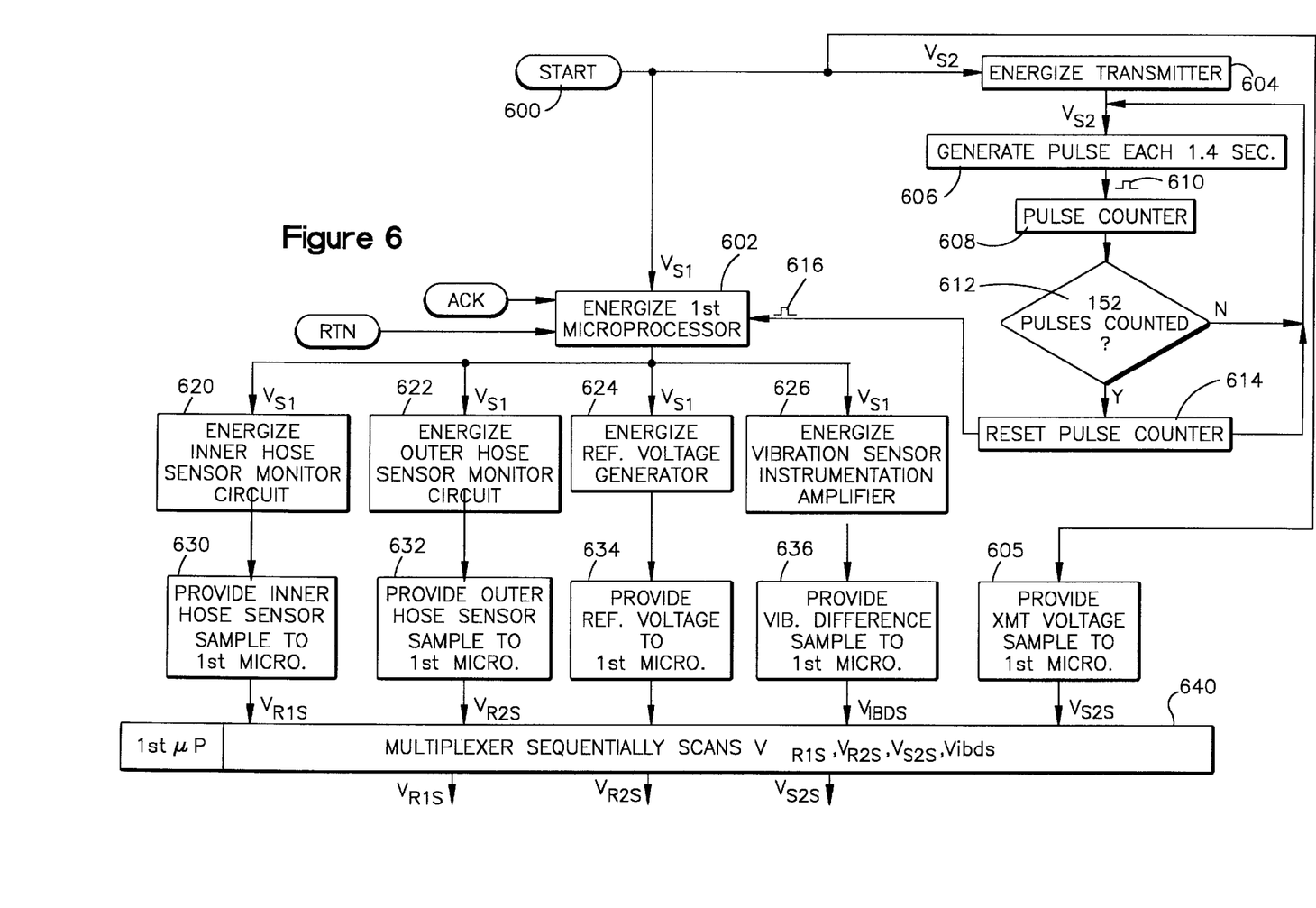
FIG. 6 is a flow chart portraying a portion of a process according the invention.
Figure 6A:
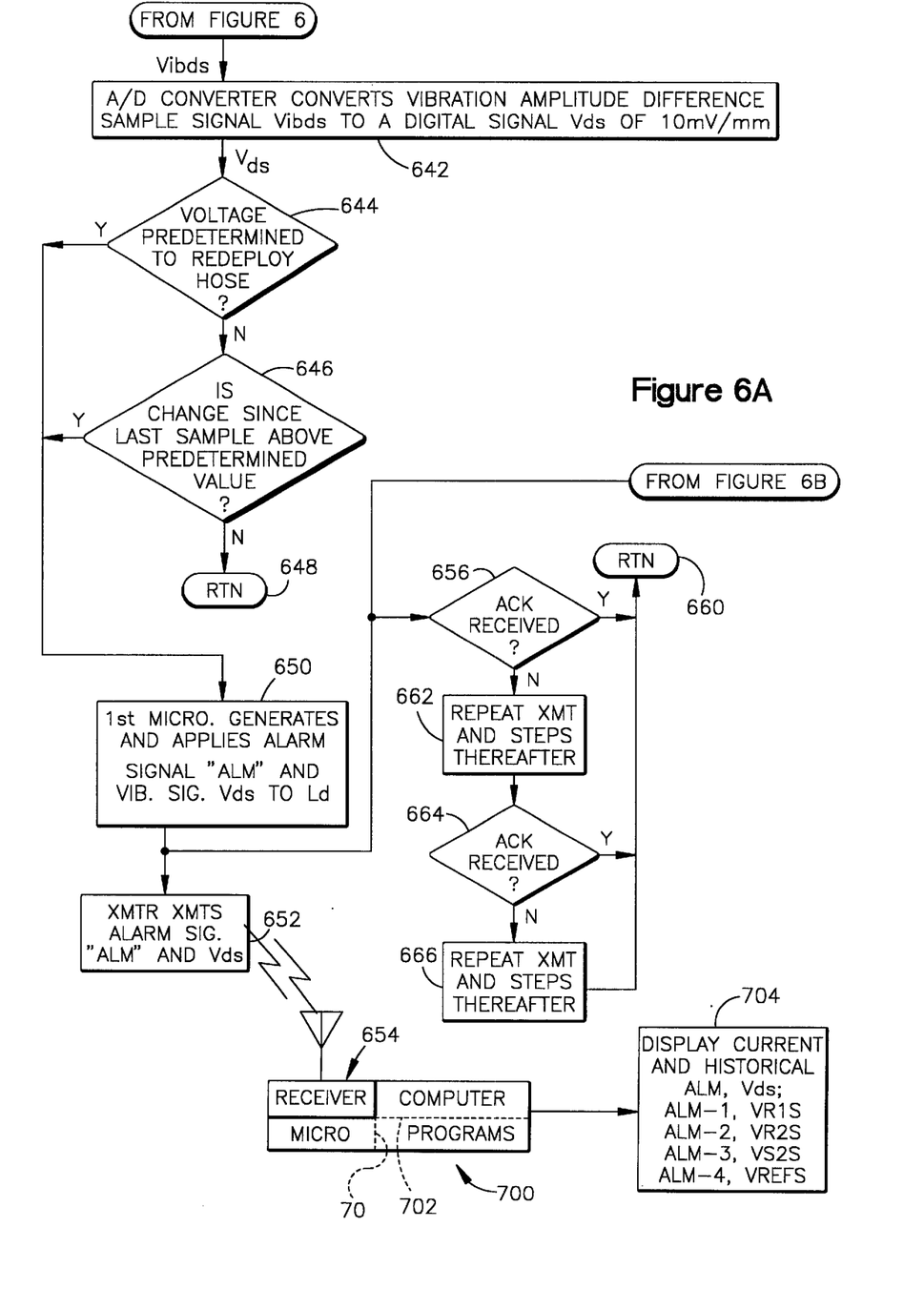
FIG. 6A is a flow chart portraying another portion of the process according to the invention.
Figure 6B:
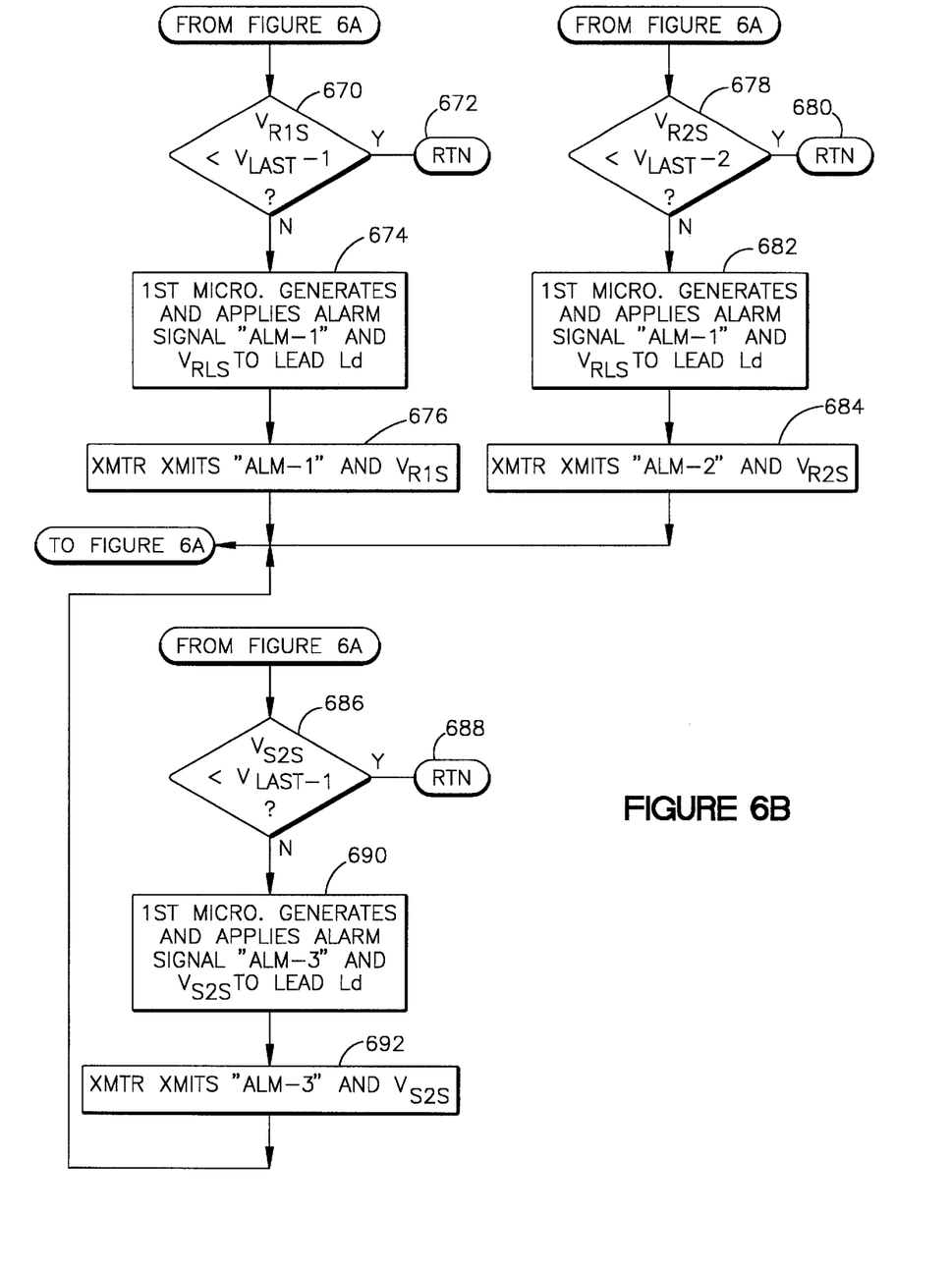
FIG. 6B is a flow chart portraying yet another portion of the process according to the invention.

The first, second and third microprocessors, 500, 510 and 532 (FIG. 5), are respectively conventionally programmed to execute each of the steps, if any, attributed thereto in the foregoing discussion and in the following process. Assuming the electronic hose tag 310 (FIG. 4) is secured to the hose 10 and the battery 550 is attached thereto for energization thereof, the process portrayed in FIGS. 6, 6A and 6B is started, step 600. Whereupon the first microprocessor 500 and transmitter structure 420, and thus the second microprocessor 510 thereof, are concurrently energized, steps 602 and 604. In addition, transmitter voltage sensing structure 136 provides a transmitter voltage sample Vs2s to the first microprocessor 500, step 605 that is representative of voltage Vs2 provided to the transmitter structure 430. Thereafter, the transmitter structure 430 generates a pulse 610, step 606, at the end of a predetermined time interval, exemplified by the time interval of 1.4 seconds. The pulse 606 is applied by the second microprocessor 510 to the internal pulse counter 512 thereof, step 608, followed by the second microprocessor 510 implementing the step 612 of inquiring whether a predetermined pulse count, exemplified by a pulse count of 152 pulses, has been attained. Assuming, the inquiry is answered negatively, step 610, processing is returned to step 606 and recycled therethrough and through steps 610, and 612, until the inquiry of step 612 is answered affirmatively. Without departing from the spirit and scope of the invention, the pulse counter 510 may be conventionally loaded with a predetermined count, exemplified by the count of 152 pulses, and be programmed to sequentially count down to zero in response to the application thereto of sequential pulses 610. In either case, when the inquiry of step 612 is answered affirmatively, the second microprocessor 510 causes the pulse counter 510 to be reset, step 614, return processing to step 606 to recommence the aforesaid pulse generation and counting process, and provide another count signal 616 to the first microprocessor 500.

Upon detecting the count signal 616 (FIG. 6), the first microprocessor 500 applies the voltage Vs1 to the inner and outer hose sensor monitoring circuits, 404 and 412, the reference voltage generating structure 522, and the vibration sensor instrumentation amplifier 520, for energization thereof, steps 620, 622, 624 and 626. Upon energization thereof, the inner and outer hose sensor monitoring circuits, 404 and 412, respectively provide voltage sample signals, Vr1s and Vr2s, to the first microprocessor 500, steps 630 and 632, that are representative of the continuity values of the inner and outer hose sensor elements, 112 and 120. In addition, the reference voltage generating structure 522 provides a reference voltage sample signal Vrefs to the first microprocessor 500, step 634, that is representative of the reference voltage Vref. Further, the vibration sensor instrumentation amplifier 525, provides an analog vibration amplitude difference sample signal Vibds to the first microprocessor 500 that is representative of the amplitude of vibration of the hose 100 over and above that of the abrasive material transport system (not shown) in which the hose 100 is installed.

The multiplexer 504 (FIGS. 5 and 6) repeatedly sequentially scans ports p2–p5 and p7 of the first microprocessor 500, step 640, and sequentially processes each of the continuity, transmitter structure, reference voltage and vibration amplitude difference sample signals, Vr1s, Vr2s, Vs2s, Vrefs and Vibds.

As the multiplexer 504 (FIGS. 5 and 6) repeatedly scans port p7, the first microprocessor 500, step 640, sequentially applies the analog vibration amplitude difference sample signals Vibds to the A/D converter 502. And the A/D converter 502, step 642, sequentially converts the vibration amplitude sample signals Vibds, to respective digital vibration amplitude difference signals "Vds" signals, each having a predetermined voltage level, such as 10 to 100 millivolts per millimeter, of amplitude of hose vibration. The first microprocessor 500 then inquires, step 644, whether the digital vibration difference sample signal Vds is greater than a voltage level predetermined to be desirable to stop the flow of abrasive materials through the hose 100 and re-deploy the hose 100. Assuming the inquiry of step 644 is negatively answered, the first microprocessor 500 inquires, step 646, whether the digital vibration difference sample signal Vds has changed, since the last sample was taken, by a predetermined voltage amount corresponding to a selected vibration amplitude difference, exemplified by the voltage amount of about twenty (20) to two hundred (200) millivolts, corresponding to an amplitude difference of two (2) millimeters. Assuming each of the inquiries of steps 644 and 646 are answered negatively, then, processing is returned RTN, step 648, to the first microprocessor 500. On the other hand, if an inquiry of either of the steps 644 or 646 is affirmatively answered, an unfavorable digital vibration amplitude difference sample signal Vds has been received. Whereupon, the first microprocessor 500 applies the unfavorable vibration amplitude difference sample signal Vds to the data lead Ld of the transmitter microprocessor 510, step 650. In addition, the first microprocessor 500 generates and applies an alarm signal "Alm" to the data lead Ld of the transmitter microprocessor 510, step 650. Upon receiving the aforesaid alarm and unfavorable sample signals, Alm and Vds, the transmitter structure 430, under the control of the second microprocessor 512, preferably transmits, step 652, such signals, Alm and Vds, a plurality of times, for example 12 times, to a remote receiver 654, assuming that step 664 is again negatively answered, then, data transfer, step 266, followed by returning processing step 660 to the first microprocessor at step 202. Of course, assuming that step 664 in any of the above instances affirmatively answered, processing is also returned, step 660 to the first microprocessor 500.

The above discussed procedure of providing for multiple signal transmissions has been adopted to be sure that the transmitted alarm ALM and unfavorable signals Vds are timely received by the remote receiver 654, which may be receiving other input signals at the time of initial transmission by the transmitter structure 430.

As the multiplexer 504 (FIGS. 5, 6, 6A and 6B) repeatedly scans port p2, the first microprocessor 500 sequentially implements the step 670 of inquiring whether the inner hose sensing element sample signal Vr1s is less than a voltage level corresponding to a discontinuity, Vmax-1, exemplified by a voltage level of 1000 times the value thereof when the flow of abrasive material in the hose 100 is initiated. In this connection it is noted that the initial resistance of the inner hose sensing element 112 is exemplified by a value of 10,000 ohms, whereas the discontinuity value thereof is exemplified by a value of 1,000,000 ohms. Assuming the inquiry of step 670 is answered affirmatively, processing is returned RTN, step 672, to step 602. Assuming however that the inquiry of step 670 is answered negatively, thereby indicating that there is a discontinuity in the inner hose sensing element 112 and thus a worn-through area of the inner liner 104 of the hose 100, the first microprocessor 500 implements the step 674 of generating and applying an alarm signal Alm-1 together with the discontinuity value Vr1s of the hose sensing element 112 to the data lead Ld of the transmitter structure 430. Upon receiving the aforesaid alarm and unfavorable sample signals, Alm-1 and Vr1s, the transmitter structure 430 transmits, step 674, such signals, Alm-1 and Vr1s, a plurality of times, for example 12 times, to the remote receiver 654. Thereafter the processing hereinbefore discussed in connection with steps 656, 658, 660, 662, 664, and 666, is implemented with respect to the discontinuity signal Vr1s and associated alarm signal ALM-1.

As the multiplexer 504 (FIGS. 5, 6, 6A and 6B) repeatedly scans port p3, the first microprocessor 500 sequentially implements the 678 of inquiring whether the outer hose sensing element sample signal Vr2s is less than a voltage level corresponding to a discontinuity, vmax-2, exemplified by a voltage level of 1000 times the value thereof when the flow of abrasive material in the hose 100 is initiated. In this connection it is noted that the initial resistance of the second sensing element is exemplified by a value of 10,000 ohms, whereas the discontinuity value thereof is exemplified by a value of 1,000,000 ohms. Assuming the inquiry of step 678 is answered affirmatively, processing is returned RTN, step 680, to step 602. Assuming however that the inquiry of step 778 is answered negatively, thereby indicating that there is a discontinuity in the outer hose sensing element 120 and thus a worn-through area of the outer liner 108a of the hose 100, the first microprocessor 500 implements the step 682 of generating and applying an alarm signal ALM-2, together with the discontinuity value Vr2s of the hose sensing element 120, to the data lead Ld of the transmitter structure 430. Upon receiving the aforesaid alarm and unfavorable sample signals, Alm-2 and Vr2s, the transmitter structure 430 transmits, step 684, such signals, Alm-2 and Vr2s, a plurality of times, for example 12 times, to the remote receiver 654. Thereafter the processing hereinbefore discussed in connection with steps 656, 658, 660, 662, 664, and 666, is implemented with respect to the discontinuity signal Vr2s and associated alarm signal ALM-2.

As the multiplexer 504 (FIGS. 5, 6, 6A and 6B) repeatedly scans port p4, the first microprocessor 500 sequentially implements the step 686 of inquiring whether the transmitter structure voltage sample signal Vs2s, is less than a predetermined voltage level corresponding to a marginal voltage level, Vmin-1, suitable for transmitting data Ds to the remote receiver 654. Assuming the inquiry of step 686 is answered affirmatively, processing is returned RTN, step 688, to step 602. Assuming however that the inquiry of step 686 is answered negatively, thereby indicating that the transmitter voltage sample Vs2s, and thus the transmitter voltage V2s itself, is at or less than the marginal level Vmin-1 for data transmission purposes, the first microprocessor 500 implements the step 690 of generating and applying an alarm signal Alm-3 together with the marginal transmitter voltage value Vs2s to the data lead Ld of the transmitter structure 430. Upon receiving the aforesaid alarm and unfavorable signals, Alm-3 and Vs2s, the transmitter structure 430 transmits, step 692, such signals, Alm-3 and Vs2s, a plurality of times, for example 12 times, to the remote receiver 654. Thereafter the processing hereinbefore discussed in connection with steps 656, 658, 660, 662, 664, and 666, is implemented with respect to marginal transmitter voltage sample signal Vs2s and associated alarm signal Alm-3.

The electronic hose tag 310 (FIG. 3) according to the invention is preferably incorporated in a monitoring system 700 (FIG. 6) including the remote receiver 654, wherein the remote receiver has and a computer 702 and a display 704 which are conventionally electrically connected to one another. The remote receiver 654 thus includes a conventional microprocessor 706 that is conventionally programmed for storing and displaying respective continuity, transmitter structure, reference voltage and vibration amplitude difference sample signals, Vr1s, Vr2s, Vs2s, Vrefs and Vibds transmitted thereto in the course of testing a plurality of hoses 100. Thus users the electronic hose tag 310 according to the invention are in an unprecedented position of having access to accurate historical data concerning the breakdown of numerous hoses 100 utilized for guiding the same type of abrasive material. permitting such users to experiment with the adjustment in fluid content values, partial hose rotations and other aspects of hose performance width a view to prolonging the life of a given hose 100.

Although the inventions described herein have been shown in a few embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A process for monitoring a physical condition of a hose for moving abrasive materials including an inner liner; a carcass having at least one ply disposed coaxially of and in surrounding relationship with the inner liner; an outer cover that is disposed coaxially of and in surrounding relationship with the carcass; an inner sensing element comprising a first pair of sensor wires each having a first end extending to a first end of the hose and a second end extending to a second end of the hose, wherein the second end of the first pair of sensor wires are connected to one another; an outer sensing element comprising a second pair of sensor wires each having a first end extending to the first end of the hose and a second end extending to the second end of the hose, wherein the second end of the second pair of sensor wires are connected to one another, the process characterized by the steps of:
   (a) providing an inner sensing element monitoring circuit with a microprocessor connected thereto; and
   (b) impressing an inner sensing element continuity sample signal from the inner sensing element monitoring circuit on the microprocessor.

2. The process according to claim 1 including the step of:
   determining whether the inner sensing element continuity sample signal is less than a first predetermined maximum value indicating that there is a discontinuity in the inner sensing element and thus a worn through area of the inner liner.

3. The process according to claim 2 including the steps of:
   providing a transmitter structure;
   generating a first alarm signal with the microprocessor; and
   applying the first alarm signal and the inner sensing element continuity sample signal to the transmitter structure when the inner sensing element continuity sample signal is at least equal to the first predetermined maximum value.

4. The process according to claim 3 including the step of:
   transmitting the first alarm signal and the inner sensing element continuity sample signal from the transmitter structure to a remote receiver.

5. The process according to claim 1 including the steps of: providing an outer sensing element monitoring circuit connected to the microprocessor; and impressing an outer sensing element continuity sample signal from the outer sensing element monitoring circuit on the microprocessor.

6. The process according to claim 5 including the step of:
   determining whether the outer sensing element continuity sample signal is less than a second predetermined maximum value indicating that there is a discontinuity in the outer sensing element and thus a worn through area of the at least one ply.

7. The process according to claim 6 including the steps of:
   generating a second alarm signal with the microprocessor; and
   applying the second alarm signal and the outer sensing element continuity sample signal to the transmitter structure when the outer sensing element continuity sample signal is at least equal to the second predetermined maximum value.

8. The process according to claim 7 including the step of:
   transmitting the second alarm signal and the outer sensing element continuity sample signal with the transmitter structure to a remote receiver.

9. A process for monitoring a physical condition of a hose for moving abrasive materials including an inner liner; a carcass having at least one ply disposed coaxially of and in surrounding relationship with the inner liner; an outer cover that is disposed coaxially of and in surrounding relationship with the carcass; an inner sensing element comprising a first pair of sensor wires each having a first end extending to a first end of the hose and a second end extending to a second end of the hose, wherein the second end of the first pair of sensor wires are connected to one another; an outer sensing element comprising a second pair of sensor wires each having a first end extending to the first end of the hose and a second end extending to the second end of the hose, wherein the second end of the second pair of sensor wires are connected to one another; the process characterized by the steps of:
   (a) providing an inner sensing element monitoring circuit with a microprocessor connected thereto; and
   (b) impressing an inner sensing element continuity sample signal from the inner sensing element monitoring circuit on the microprocessor;
   determining whether the inner sensing element continuity sample signal is less than a first predetermined maximum value indicating that there is a discontinuity in the inner sensing element and thus a worn through area of the inner liner;
   providing a transmitter structure;
   generating a first alarm signal with the microprocessor;
   applying the first alarm signal and the inner sensing element continuity sample signal to the transmitter structure when the inner sensing element continuity sample signal is at least equal to the first predetermined maximum value;
   transmitting the first alarm signal and the inner sensing element continuity sample signal from the transmitter structure to a remote receiver;
   providing the hose with an outer sensing element helically wound about at least one of the impressing an outer sensing element continuity sample signal from the outer sensing element monitoring circuit on the microprocessor;
   determining whether the outer sensing element continuity sample signal is less than a second predetermined maximum value indicating that there is a discontinuity in the outer sensing element and thus a worn through area of the at least one ply;
   generating a second alarm signal with the microprocessor; and
   applying the second alarm signal and the outer sensing element continuity sample signal to the transmitter structure when the outer sensing element continuity sample signal is at least equal to the second predetermined maximum value; and
   transmitting the second alarm signal and the outer sensing element continuity sample signal with the transmitter structure to the remote receiver.

10. The process according to claim 9, wherein the abrasive materials comprise mineral bearing ores in either a fluidized or dry bulk state.

* * * * *